United States Patent [19]

Woodward

[11] Patent Number: 4,641,782
[45] Date of Patent: Feb. 10, 1987

[54] JET PROPULSION NOZZLE

[75] Inventor: Clifford S. Woodward, Bristol, England

[73] Assignee: Rolls-Royce plc, London, England

[21] Appl. No.: 356,908

[22] Filed: Feb. 18, 1982

[30] Foreign Application Priority Data

Feb. 24, 1981 [GB] United Kingdom ............... 8105843

[51] Int. Cl.$^4$ ........................... F02K 1/11; F02K 1/12
[52] U.S. Cl. ........................ 239/265.29; 239/265.35; 239/265.37
[58] Field of Search .................... 60/230, 232, 271; 239/265.29, 265.35, 265.39, 265.41, 265.37

[56] References Cited

U.S. PATENT DOCUMENTS

| 3,734,411 | 5/1973 | Wolf et al. | 239/265.29 |
| 4,052,007 | 10/1977 | Willard | 239/265.41 |
| 4,099,671 | 7/1978 | Leibach | 239/265.29 |
| 4,241,876 | 12/1980 | Pedersen | 239/265.27 |
| 4,375,276 | 3/1983 | Konarski | 60/232 |

Primary Examiner—Stephen C. Bentley
Attorney, Agent, or Firm—Parkhurst & Oliff

[57] ABSTRACT

Jet propulsion nozzle comprises a pair of mutually confronting side walls 11, a pair of mutually confronting first panels 14 extending transversely between the walls and being supported thereon for pivotal movement about a first axis 18. A pair of mutually confronting second panels 20 situated downstream of the first panels are pivotally supported on the respective first panels by pivots 21. Actuators 19,24 are adapted to pivot the panels 14,20 so that the panels can be moved between a convergent position (as shown) and a convergent-divergent position. Further, the second panels can be pivoted into a position in which they divert the flow obliquely away from the normal flow axis 15 of the nozzle, and the first panels can be pivoted into a position in which they reverse the flow through openings 34 normally closed by these panels.

5 Claims, 5 Drawing Figures

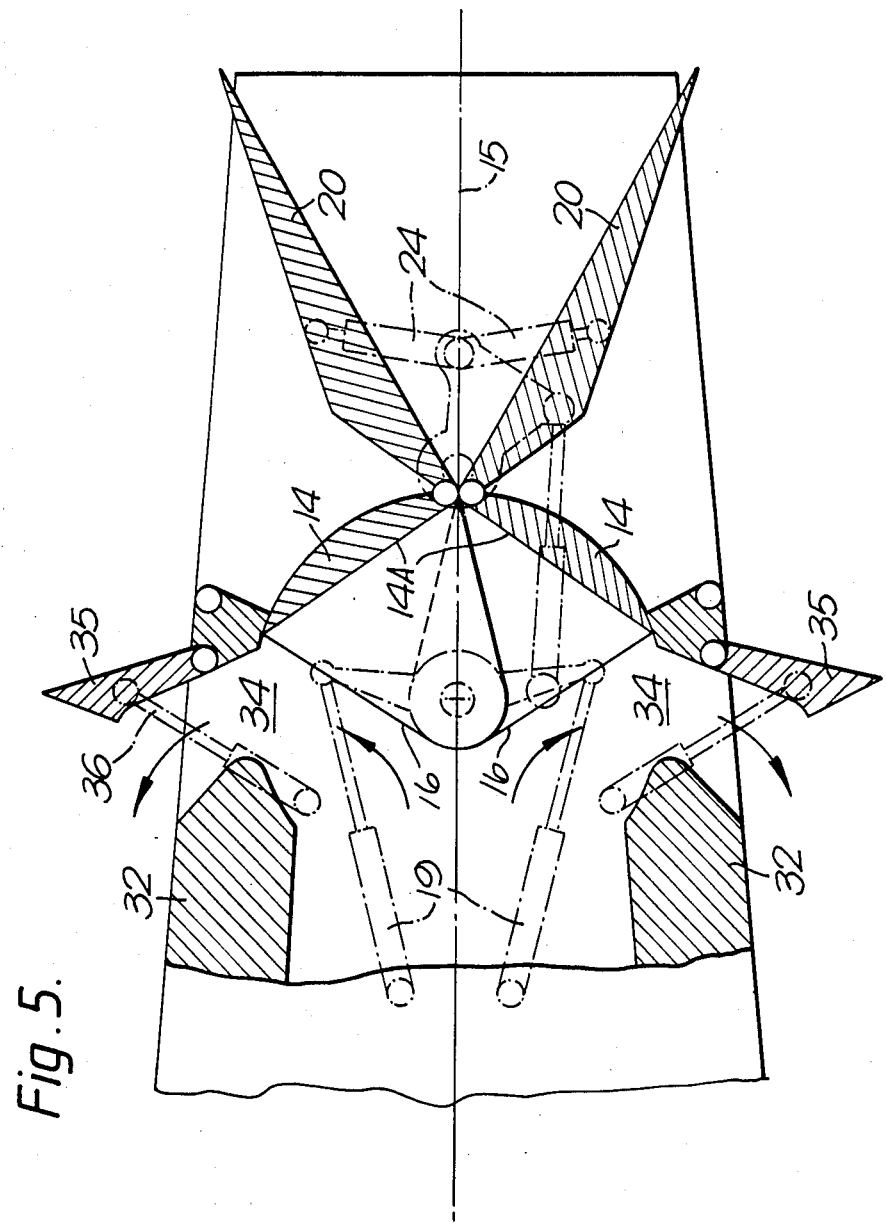

JET PROPULSION NOZZLE

This invention relates to a jet propulsion nozzle.

It is an object of this invention to provide improved means for converting the nozzle between a convergent-divergent configuration.

According to this invention there is provided a jet propulsion nozzle comprising a pair of mutually confronting walls, a pair of mutually confronting first panels extending transversely between the walls, each first panel being supported on the walls for pivotal movement about a first axis lying between the first panels and extending transversely between the walls, a pair of mutually confronting second panels extending transversely between the walls, each second panel being situated adjacent a respective said first panel and being supported thereon for pivotal motion about a second axis parallel to the first axis, said walls and panels defining between them a flow duct, first means for pivoting each first panels about the associated first axis and second means for pivoting each second panel about the associated second axis independently of the pivotal position of the first panels, thereby to enable the panels to be moved into positions wherein said duct is respectively convergent and a convergent-divergent.

An example of a nozzle according to this invention will now be described with reference to the accompanying drawings wherein:

FIGS. 3, 4 and 5 are views similar to FIG. 2 but showing different operational positions.

Figure 1:
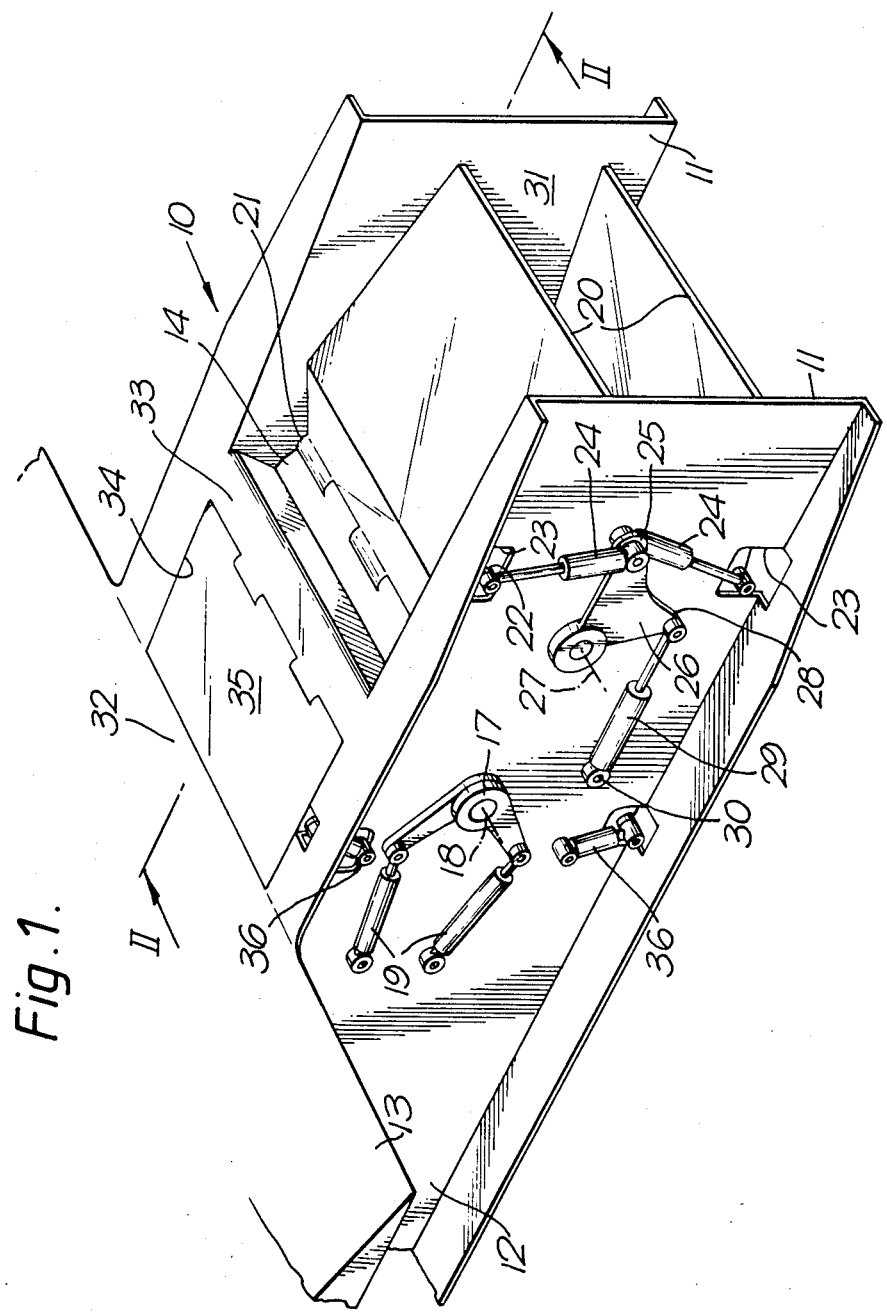
FIG. 1 is a perspective of the nozzle.

Referring to FIG. 1, the nozzle, generally denoted 10, comprises two side walls 11 which extend rearwardly from a nacelle 12 secured to the underside of an aircraft wing 13 and housing a gas turbine engine (not shown).

Figure 2:
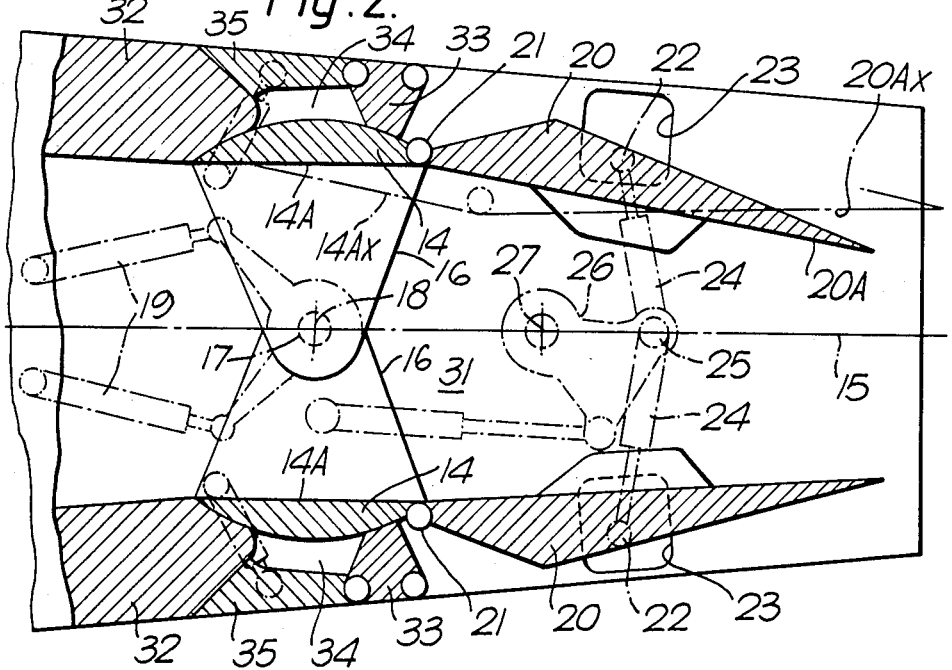
FIG. 2 is a section on the line II—II in FIG. 1.

Referring now also to FIG. 2, the nozzle 10 comprises a pair of mutually confronting first panels 14 extending transversely between the walls 11 and spaced apart to opposite sides of the nozzle main axis denoted 15. Each panel 14 is secured to a pair of plates 16 lying adjacent the respective walls 11 and having pivot elements 17 whereby the panel is supported on the walls 11 for pivotal motion about an axis 18 extending transversely between the walls 11 and through the axis 15. The elements 17 extend through the walls 11 and are connected at the outside thereof to levers and hydraulic actuators 19 for effecting the pivotal motion of the panels 14.

The nozzle 10 further comprises a pair of second panels 20 extending transversely between the walls 11 and spaced apart to opposite sides of the axis 15. Each panel 20 is situated adjacent one of the panels 16 downstream thereof and the panels 14,20 are connected at their adjacent edges by pivots 21 whose axes are parallel to the axis 18. Each panel 20 is provided with a pin 22 extending through an opening 23 in the adjacent wall 11 and connected by an actuator 24 to one end 25 of a bellcrank lever 26 supported on the adjacent wall for pivotal motion about an axis 27. The other end 28 of the lever 26 is connected to an actuator 29 mounted on the adjacent wall 11 at 30. The actuators 24 define links whereby the panels 20 are supported to follow the pivotal motion of the panels 14. The actuators 24 are also a means whereby the panels 20 can be turned about the pivots 21 independently of one another and of the panels 14. The actuator 29, acting through the lever 26, is a means for pivoting the panels 20 about the pivots 21 simultaneously and in the same angular sense.

The panels 14,20 and the walls 11 define a flow duct 31 for the combustion products from the engine, the walls being the lateral, and the panels 14,20 being the upper and lower confines of that duct. The upstream end of the nozzle 10 is defined at members 32 fixedly connecting the upper and lower portions of the walls 11. Downstream of each member 32 is provided a member 33 also fixedly connecting the walls 11. Between each pair of members 32,33 is provided an opening 34 which is closed at the interior of the nozzle by the adjacent panel 14 and at the exterior of the nozzle by a panel 35 hinged to the member 33. The opening 34 can be opened by pivoting the panels 14,35, the latter panel being pivoted by an actuator 36.

FIG. 2 shows the nozzle 10 in the convergent mode, that is, surfaces 14A of the panels 14 facing the interior of the duct 31 are parallel while surfaces 20A of the panels facing the interior of the duct 31 are convergent. Alternatively, the convergent mode is attainable by operating the actuators 19 for the surfaces 14A to be convergent while the actuators 24 are operated to move the panels 20 for the surfaces 20A to be parallel, this being shown at 14AX, 20AX.

Figure 3:
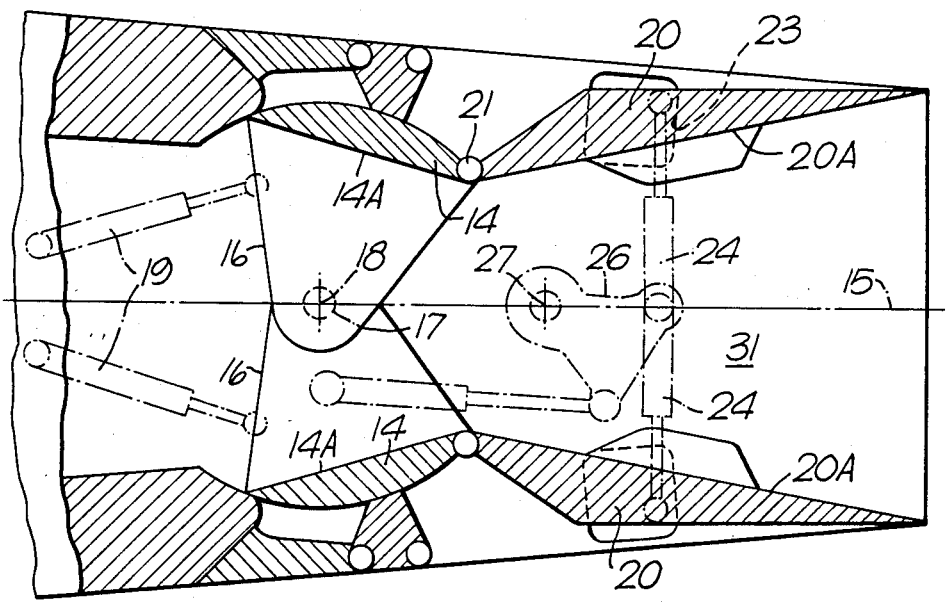

If the nozzle 10 is to be deployed in a convergent-divergent mode, FIG. 3, the actuators 19 are extended to move the panels 14 so that the surfaces 14A are convergent, and the actuators 24 are extended to move the panels 20 for the surfaces 20A to become divergent.

Figure 4:
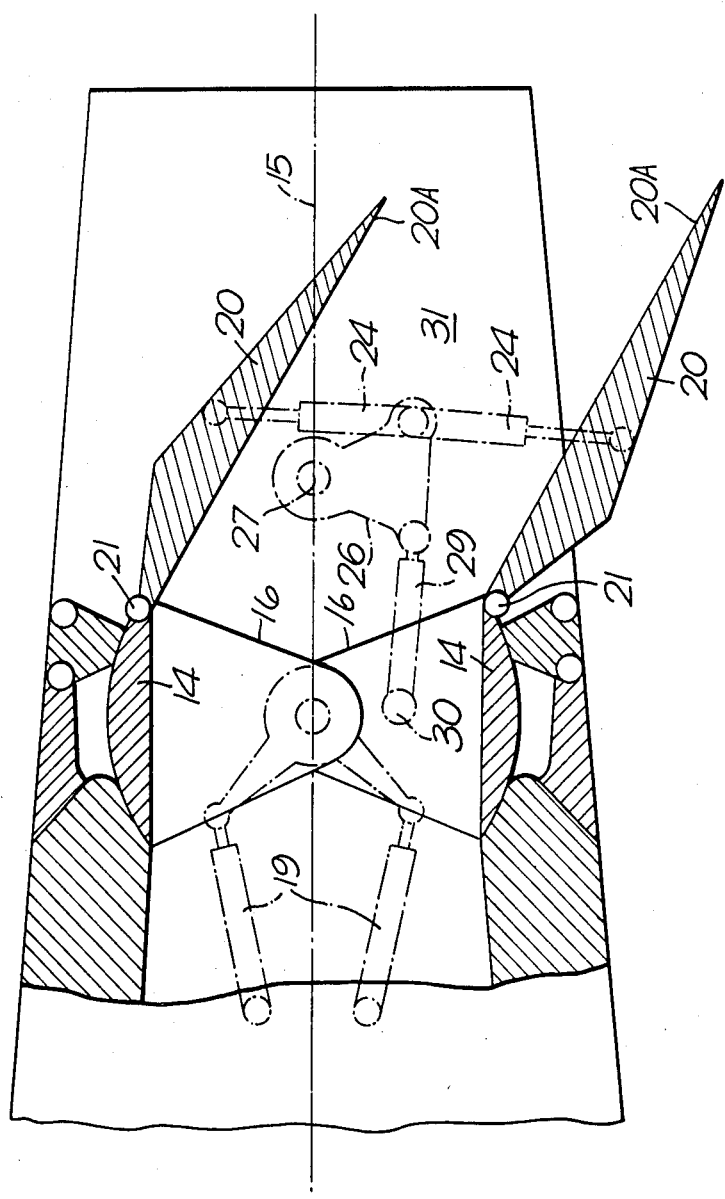

If the nozzle 10 is to be deployed in a downwardly vectored mode, FIG. 4, the actuator 29 is contracted so that the lever 26 acts on both actuators 24 to move both panels 20 downwards for the surfaces 20A to attain a downward and rearward attitude relative to the axis 15. Either one of the panels 20 can be moved by its associated actuator 24 to achieve a required degree of convergence of the surfaces 20A in this mode.

If the nozzle 10 is to be deployed in a thrust reversing mode, FIG. 5, the actuators 19 are extended to move the panels 14 rearwards sufficiently far to clear the openings 34, and the actuators 36 are extended to move the panels 35 into the open position. In this mode, the actuators 24 are preferably contracted to the maximum extent to avoid any unduly small angle between the adjacent panels 14,20.

I claim:

1. A jet propulsion nozzle comprising a pair of mutually confronting walls, a pair of mutually confronting first panels extending transversely between the walls, each first panel being supported on the walls for pivotal movement about a common first axis positioned between said pair of first panels and extending transversely between the walls, a pair of mutually confronting second panels extending transversely between the walls, each second panel being situated adjacent a respective one of said first pair of panels and being supported thereon for pivotal motion about a second axis parallel to said first common axis, said walls and panels defining between them a flow duct, first means for pivoting each of said first panels about the common first axis and second means for pivoting each of said second panels about the second axis, independently of any pivotal position of the first panels, thereby permitting the panels to be moved into positions wherein said duct becomes respectively convergent and a convergent-divergent, such that when said first panels are in a first position, the panels obturate thrust reverser openings and comprise the flow duct, and when said first panels are in a second position, the panels obturate said flow duct and comprise a thrust reverser.

2. The nozzle according to claim 1, wherein the first panels are pivotable between a first position in which the panels are substantially in line with a mean direction of flow through the duct and a second position in which the panels are transverse to said direction, thereby opposing the flow through the duct, the nozzle structure further comprising openings which are closed by the first panels when the first panels are in said first position and are opened by movement of the first panels into said second position.

3. The nozzle according to claim 1 or claim 2, further comprising means for pivoting the second panels jointly, thereby varying the direction of efflux from the nozzle.

4. A jet propulsion nozzle comprising a pair of mutually confronting walls, a pair of mutually confronting first panels extending transversely between the walls, each first panel being supported on the walls for pivotal movement about a common first axis positioned between said pair of first panels and extending transversely between the walls, a pair of mutually confronting second panels extending transversely between the walls, each second panel being situated adjacent a respective one of said first pair of panels and being supported thereon for pivotal motion about a second axis parallel to said first common axis, said walls and panels defining between them a flow duct, first means for pivoting each of said first panels about the common first axis and second means for pivoting each of said second panels about the second axis, independently of any pivotal position of the first panels, thereby permitting the panels to be moved into positions wherein said duct becomes respectively convergent and convergent-divergent, said first panel being pivotal between a first position wherein said first panels are substantially in line with a mean direction of flow through the duct and a second position in which the first panels are transverse to said direction, thereby stopping the flow through the duct, the nozzle structure further comprising openings which are obturated by the first panels when the first panels are in said first position and are opened by movement of the first panels into said second position.

5. A jet propulsion nozzle comprising a pair of mutually confronting walls, a pair of mutually confronting first panels extending transversely between the walls, each first panel being supported on the walls for pivotal movement about a common first axis positioned between said pair of first panels and extending transversely between the walls, a pair of mutually confronting second panels extending transversely between the walls, each second panel being situated adjacent a respective one of said first pair of panels and being supported thereon for pivotal motion about a second axis parallel to said first common axis, said walls and panels defining between them a flow duct, first means for pivoting each of said first panels about the common first axis and second means for pivoting each of said second panels about the second axis, independently of any pivotal position of the first panels, thereby permitting the panels to be moved into positions wherein said duct becomes respectively convergent and convergent-divergent, said first panel being pivotal between a first position wherein said first panels are substantially in line with a mean direction of flow through the duct and a second position in which the first panels are transverse to said direction, thereby stopping the flow through the duct, the nozzle structure further comprising openings which are obturated by the first panels when the first panels are in said first position and are opened by movement of the first panels into said second position, and a means for pivoting the second panels jointly, thereby varying the direction of efflux from the nozzle.

* * * * *